3,306,913
2-GUANIDINOALKYL-3,4-DIHYDRO-2H-1,5-
BENZODIOXEPINES
Joachim Augstein and Alastair Monro, Canterbury, Geoffrey W. H. Potter, Ramsgate, and Thomas I. Wrigley, Canterbury, England, assignors to Chas. Pfizer & Co., Inc., New York, N.Y., a corporation of Delaware
No Drawing. Filed Feb. 12, 1965, Ser. No. 432,396
Claims priority, application Great Britain, Feb. 14, 1964, 6,225/64
10 Claims. (Cl. 260—340.3)

This invention relates to new and useful compounds in the field of medicinal chemistry. More particularly, it is concerned with certain novel organic heterocycles which have been found to be useful as theraputic agents in view of the interesting biological properties they possess.

The compounds which are included within the purview of the present invention are all selected from the class of organic bases of the following general structural formula:

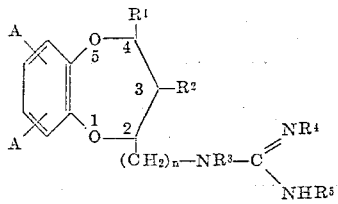

and the mineral and organic acid addition salts thereof, wherein each of A and B is a member selected from the group consisting of hydrogen, chlorine, bromine, lower alkyl and lower alkoxy; $n$ is an integer of from one to four carbon atoms, and each of $R^1$, $R^2$, $R^3$, $R^4$ and $R^5$ is a member selected from the group consisting of hydrogen and lower alkyl. Typical member compounds of this series include such 2-guanidinoalkyl-3,4-dihydro-2H-1,5-benzodioxepines as 2-guanidinomethyl-3,4-dihydro - 2H - 1,5-benzodioxepine; 2-guanidinomethyl-7,8-dichloro-3,4-dihydro - 2H - 1,5 - benzodioxepine; 2-(3-guandinopropyl)-3,4-dihydro - 2H - 1,5-benzodioxepine; 2-(1-methylguanidino)methyl-3,4-dihydro - 2H - 1,5-benzodioxepine; 2-guanidinomethyl - 3 - methyl-3,4-dihydro-2H-1,5-benzodioxepine, and the like. These compounds are all of value in the treatment of hypertension.

The process employed for preparing the novel compounds of this invention involves treating an appropriately substituted 2 - aminoalkyl-3,4-dihydro - 2H - 1,5-benzodioxepine compound with a guanidine-forming reagent of the following type in the manner hereinafter described, viz; (1) by reacting a 2-aminoalkyl - 3,4 - dihydro-2H-1,5-benzodioxepine salt, such as the hydrochloride, with a cyanamide compound like cyanamide itself or with an appropriately substituted derivative thereof in the case of a 2-aminoalkyl-3,4-dihydro - 2H - 1,5-benzodioxepine salt, or by fusion reaction of said amine salt with a dicyanamide compound to form the corresponding 2-guanidinoalkyl-3,4-dihydro-2H-1,5 - benzodioxepine salt direct; (2) by reacting the 2-aminoalkyl-3,4-dihydro-2H-1,5-benzodioxepine base compound with a suitable lower S-alkyl isothiouronium salt having the requisite number and type of substituent groups, such as S-methyl isothiouronium sulfate or N,N',S-trimethyl isothiouronium hydrochloride, for example; (3) by reacting said amine base compound with a salt of the appropriate guanyl-pyrazole, such as a salt of 3,5-dimethyl-1-guanylpyrazole, to also form the corresponding 2-guanidinoalkyl-3,4-dihydro-2H-1,5-benzodioxepine salt, and (4) by reacting said amine base with a cyanogen halide like cyanogen bromide, followed by treatment of the resulting intermediate N-cyano compound with ammonia or with an appropriate organic amine to form the corresponding 2-guanidinoalkyl-3,4-dihydro-2H-1,5 - benzodioxepine base compound.

The starting materials necessary for the above reaction methods leading to the desired guanidino compounds are either all known compounds or else they can easily be prepared by those skilled in the art in accordance with standard organic procedures. For instance, the 2-aminoalkyl-3,4-dihydro-2H-1,5 - benzodioxepines required for conversion to the guanidines are easily prepared from known routes starting from the corresponding carboxylic acid amides which are, in turn, prepared from the corresponding carboxylic acids themselves. The amides are then converted to the amines by standard reductive methods for these purposes. The carboxylic acids concerned are obtainable by routes of themselves well-known in the art, like that described in Belgian Patent No. 613,212, starting from catechol or an appropriately substituted catechol.

The preferred method employed for preparing the novel compounds of this invention involves treating an appropriately substituted 2-aminoalkyl-3,4-dihydro - 2H-1,5-benzodioxepine compound with a suitable S-alkyl isothiouronium salt having the requisite substituent groups. This particular reaction is normally carried out in a reaction-inert polar solvent medium at a temperature ranging from about 20° C. up to about 120° C. for a period of about one to about 72 hours, and most conveniently at a temperature ranging from about 60° C. to about 100° C. for from about one to twenty hours. In practice, it is generally most convenient to heat the two reactants together under reflux in the polar solvent, employing substantially equimolar amounts of starting materials for this purpose although a slight excess of one or the other is not harmful in this respect. The desired S-alkyl isothiouronium salt reagent, of course, is preferably one where the S-alkyl group is lower alkyl in view of relative ease with which such a reaction takes place due to the more volatile nature of the by-products produced, i.e., the lower boiling mercaptans. Preferred reaction-inert polar solvents for use in this connection include water, lower alkanols, such as methanol, ethanol and isopropanol, etc., and N,N-di-(lower alkyl)alkanoamides such as N,N-dimethylformamide, N,N - dimethylacetamide, N,N-di-ethylformamide, N,N - diethylacetamide, N,N-di(n-propyl)formamide, N-N-dimethylpropionamide, and so forth, as well as lower dialkyl sulfoxides and sulfones, such as dimethyl sulfoxide, diethyl sulfone, di-isopropyl sulfoxide and di-n-propylsulfone, etc., and mixtures of either of these two aforementioned type organic solvents with water. Upon completion of the reaction, the solvent is removed by means of conventional procedures and the resulting residue taken upon in a suitable solvent system, such as one of the aforementioned types, from which it can be subsequently crystallized. Alternatively, the product may separate first from the reaction mixture either during the course of the reaction or immediately thereafter, or it may be crystallized from the reaction solution after some initial concentration of same. A final conversion to the desired organic base compound can then be effected by treating the 2-guanidinoalkyl-3,4-dihydro-2H-1,5-benzodioxepine acid addition salt thus obtained with sufficient base in water to neutralize same, e.g., an alkaline reagent such as sodium hydroxide in water can be used. Recovery of the desired free organic base can then be had by extracting the aforesaid aqueous solution with a suitable water-immiscible organic solvent of low volatility, such as a halogenated aliphatic hydrocarbon solvent like methylene chloride, for example.

Of the remaining alternate routes previously discussed in a brief manner, the most preferred one is the previously mentioned method involving the reaction of a 2-aminoalkyl-3,4-dihydro-2H-1,5-benzodioxepine compound, such as 2-aminomethyl-3,4-dihydro-2H-1,5-benzodioxepine, with a salt of the appropriate guanylpyrazole base to form the corresponding 2-guanidinoalkyl-3,4-dihydro-2H-1,5-benzodioxepine salt direct. The preferred reagent here is a salt of 3,5-dimethyl-1-guanylpyrazole, such as the corresponding sulfate, but it is also possible to employ other lower 3,5-dialkyl-1-guanylpyrazole salts in place of 3,5-dimethyl-1-guanylpyrazole sulfate and achieve equally satisfactory results as well. This particular process is generally carried out by heating the two reactants together in an aqueous solvent medium of the type previously discussed for the S-alkyl isothiouronium method in the absence of any other reagent. Recovery of the desired product from the reaction mixture is then easily effected by evaporation of same under reduced pressure, followed by the subsequent crystallization of the resultant residue from either water or from an aqueous alcohol mixture.

Inasmuch as most of the products obtained from the foregoing guanidine-forming reactions of this invention are already in the form of their salts, the free guanidine base compounds thereof can thereafter easily be obtained by simply treating said salts with a suitably strong alkaline base reagent, such as sodium hydroxide, as previously indicated. The free base compounds can then be isolated from the aqueous alkaline medium by means of extraction into a suitable water-immiscible organic solvent phase, preferably employing one of the lower boiling solvents such as a halogenated aliphatic hydrocarbon solvent, like methylene chloride.

Insofar as the 2 - guanidinoalkyl-3,4-dihydro-2H-1,5-benzodioxepine compounds of this invention are basic compounds, they are capable of forming a wide variety of salts with various mineral and organic acids. Although such salts must be pharmaceutically acceptable when the final products are intended for oral consumption, it is possible to first isolate the desired 2-guanidinoalkyl-3,4-dihydro - 2H - 1,5-benzodioxepine compound from the reaction mixture as a pharmaceutically unacceptable salt and then to subsequently convert the latter, as indicated previously, to the free base by treatment with an alkaline reagent, followed by the final conversion to the pharmaceutically acceptable acid salt in the manner hereinafter indicated. For instance, the acid addition salts of the 2 - guanidinoalkyl-3,4-dihydro-2H-1,5-benzodioxepine compounds of this invention may be prepared by treating the base compound with a substantially equimolar amounts of the chosen acid. The salt-formation step can be carried out in an aqueous solution or in a suitable organic solvent such as methanol or ethanol. Upon careful evaporation of the solvent, the solid salt is obtained.

The acids which are used to prepare the pharmaceutically acceptable acid addition salts of the aforementioned 2 - guanidinoalkyl-3,4-dihydro - 2H - 1,5-benzodioxepine bases of this invention are those which form non-toxic acid addition salts containing pharmaceutically acceptable anions, such as the hydrochloride, hydrobromide, hydroiodide, nitrate, sulfate or bisulfate, phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts.

As previously indicated, the compounds of the present invention are all readily adapted to therapeutic use as antihypertensive agents, in which capacity, incidentally, they are especially active. This is due to their ability to lower the blood pressure of correspondingly agitated subjects to a statistically significant degree when either orally or parenterally administered to them. In addition, they are also useful as potent regulators of the cardiovascular system and are highly effective as adrenergic neurone blocking agents as well. Furthermore, no problems of toxicity or any other untoward side effects have ever been encountered with any of these compounds in their administration to animals.

In accordance with a method of treatment of the present invention, the herein described antihypertensives can be administered to an agitated subject via the oral or parenteral routes. In general, these compounds are most desirably administered in doses ranging from about 10 mg. up to about 240 mg. per day, although variations will necessarily occur depending upon the weight of the subject being treated and the particular route of administration chosen. However, a dosage level that is in the range of from about 0.15 mg. to about 4.8 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the 2-guanidinoalkyl-3,4-dihydro-2H-1,5-benzodioxepine compounds of this invention for the treatment of agitated subjects, it is to be noted that they may be administered either along or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular 2-guanidinoalkyl-3,4-dihydro-2H-1,5-benzodioxepines in sesame or peanut oil or in aqueous-propylene glycol or N,N-dimethylformamide may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular aqueous solutions are especially suitable for intravenous, intramuscular, subcutaneous and intraperitoneal injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered-glass filter or a diatomaceous-earth or unglazed porcelain filter, and finally, into a sterile container with the aid of a suction pump. Needless to say, the necessary steps should always be taken throughout the preparation of these injectable solutions to ensure that the final products are obtained in a sterile condition.

This invention is further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A solution of 5.0 g. (0.028 mole) of 2-aminomethyl-3,4-dihydro-2H-1,5-benzodioxepine (Belgian Patent No. 613,212) and 5.22 g. (0.014 mole) of 1-guanyl-3,5-dimethylpyrazole sulfate in 100 ml. of water was heated on a steam bath for 3 hours. The reaction mixture was then cooled to room temperature, and the crude material that separated was subsequently collected on a filter funnel by suction filtration. After several recrystallizations of this material from water in the presence of charcoal, there were obtained white hygroscopic crystals of pure di(2 - guanidinomethyl - 3,4-dihydro-2H-1,5-benzodioxepine)sulfate melting at 255–258° C.

Analysis.—Calcd. for $C_{22}H_{32}N_6O_8S$: C, 48.88; H, 5.97; N, 15.55; S, 5.90. Found: C, 48.97; H, 6.02; N, 15.35; S, 5.68.

*Example II*

The procedure described in Example I is repeated employing 2-aminomethyl-7,8-dichloro-3,4-dihydro-2H-1,5-benzodioxepine in place of 2-aminomethyl-3,4-dihydro-2H-1,5-benzodioxepine on the same molar basis as before. In this particular case, the corresponding product obtained is di(2-guanidinomethyl-7,8-dichloro-3,4-dihydro-2H-1,5-benzodioxepine)sulfate.

In like manner, the use of 2-aminomethyl-6-bromo-3,4-dihydro-2H-1,5-benzodioxepine as a starting material in this reaction affords di(2-guanidinomethyl-6-bromo-3,4-dihydro-2H-1,5-benzodioxepine)sulfate as the final product which is obtained.

*Example III*

The procedure described in Example I is repeated with 2 - aminomethyl - 3 - methyl-3,4-dihydro-2H-1,5-benzodioxepine as the starting material in place of the 2-aminomethyl-3,4-dihydro - 2H - 1,5 - benzodioxepine compound used before, but still maintaining the same molar proportions. In this particular case, the corresponding product obtained is di(2-guanidinomethyl-3-methyl-3,4-dihydro-2H-1,5-benzodioxepine)sulfate.

In like manner, the use of 2-aminomethyl-4-ethyl-3,4-dihydro-2H-1,5-benzodioxepine as a starting material in this reaction affords di(2-guanidinomethyl-4-ethyl-3,4-dihydro-2H-1,5-benzodioxepine)sulfate as the final product which is obtained.

*Example IV*

The procedure described in Example I is repeated on the same molar basis as before except that 2-aminomethyl-7,8-dimethoxy - 3,4 - dihydro-2H-1,5-benzodioxepine is the starting material employed in place of 2-aminomethyl-3,4-dihydro-2H-1,5-benzodioxepine. In this particular case, the corresponding product obtained is di(2-guanidinomethyl - 7,8 - dimethoxy-3,4-dihydro-2H-1,5-benzodioxepine)sulfate.

In like manner, the use of 2-aminomethyl-9-isopropoxy-3,4-dihydro-2H-1,5-benzodioxepine as a starting material in this reaction affords di(2-guanidinomethyl-9-isopropoxy-3,4-dihydro-2H-1,5-benzodioxepine)sulfate as the final product which is obtained.

*Example V*

The procedure described in Example I is followed to prepare di(2 - guanidinomethyl-6-methyl-3,4-dihydro-2H-1,5-benzodioxepine)sulfate by reacting 2-aminomethyl-6-methyl - 3,4 - dihydro-2H-1,5-benzodioxepine and 3,5-dimethyl-1-guanylpyrazole sulfate together in 100 ml. of water on an equimolar basis in the same manner of Example I.

In like manner, the use of 2-aminomethyl-8-(n-propyl)-3,4-dihydro-2H-1,5-benzodioxepine as a starting material in this reaction affords di(2 - guanidinomethyl-8-(n-propyl) - 3,4 - dihydro-2H-1,5-benzodioxepine)sulfate as the final product which is obtained.

*Example VI*

The procedure described in Example I is repeated with 2 - (2-aminoethyl)-3,4-dihydro-2H-1,5-benzodioxepine as the starting material of choice in place of the corresponding methyl compound, using the same molar proportions, of course. The particular product obtained in this case is di[2-(2-guanidinoethyl) - 3,4 - dihydro-2H-1,5-benzodioxepine]sulfate.

In like manner, the use of 2-(3-aminopropyl)-3,4-dihydro-2H-1,5-benzodioxepine as a starting material in this reaction affords di[2 - (3 - guanidinopropyl)-3,4-dihydro-2H-1,5-benzodioxepine]sulfate as the final product which is obtained.

*Example VII*

2 - (N-methyl)aminomethyl-3,4-dihydro-2H-1,5-benzodioxepine and S-methyl isothiouronium sulfate are reacted together in equimolar quantities by refluxing a 30% solution of same in aqueous ethanol for 48 hours. Upon completion of this step, the solvent is then removed by means of evaporation under reduced pressure to afford a solid residue, which is then subsequently crystallized from ethanol and then from water. In this manner, di[2-(1-methylguanidino)methyl - 3,4 - dihydro-2H-1,5-benzodioxepine]sulfate is the product which is obtained.

In like manner, 2-(N-ethyl)aminomethyl-3,4-dihydro-2H-1,5-benzodioxepine affords di[2 - (1-ethylguanidino)methyl-3,4-dihydro-2H-1,5-benzodioxepine]sulfate as the final product which is obtained when the former compound is used as the particular starting material for this reaction.

*Example VIII*

Equimolar amounts of 2-aminomethyl-3,4-dihydro-2H-1,5-benzodioxepine and N,N′,S-trimethyl isothiouronium hydriodide in a 40% by weight solution of same in aqueous dimethylformamide are warmed together on a steam bath for six hours. The solvent is then removed from the reaction mixture by means of evaporation under reduced pressure to afford a residual oil, which is subsequently made basic with 10 N aqueous sodium hydroxide solution. The resulting aqueous solution is then extracted with diethyl ether, and the ether extract thus obtained is dried over anhydrous magnesium sulfate. After removal of the drying agent by means of filtration and the ether by means of evaporation, there is obtained a residual material consisting of crude 2-(2,3-dimethylguanidinomethyl)-3,4-dihydro-2H-1,5-benzodioxepine.

This material is subsequently dissolved in methanol and added to a solution of excess *l*-di(p-toluoyl)-D-tartaric acid in the same solvent. Upon the addition of diethyl ether to the mixture, precipitation of the desired salt soon results and this is recovered by means of suction filtration to afford 2-(2,3-dimethylguanidinomethyl)-3,4-dihydro-2H-1,5-benzodioxepine *l*-di(p-toluoyl)-D-hydrogen tartrate.

*Example IX*

Ten parts of weight of di(2-guanidinomethyl-3,4-dihydro-2H-1,5-benzodioxepine)sulfate in 50 parts by volume of water is neutralized with 10 N sodium hydroxide solution. Extraction of the resulting aqueous solution with several portions of methylene chloride, followed by separation of the organic layer and its subsequent concentration under reduced pressure then affords 2-guanidinomethyl-3,4-dihydro-2H-1,5-benzodioxepine as a free base.

In like manner, when each of the other 2-guanidinoalkyl-3,4-dihydro-2H-1,5-benzodioxepine salts of this invention (for instance, those salts previously reported in Examples II–VIII) are individually subjected to this same procedure, the corresponding free organic base compound is always the product obtained.

*Example X*

The following 2-guanidinoalkyl-3,4-dihydro-2H-1,5-benzodioxepines are prepared according to the procedures described in the previous examples from the appropriate starting compounds:

respective organic base compound in absolute ether followed by introduction of the appropriate hydrogen halide gas into the reaction solution until saturation of same is complete with respect to said gas, whereupon the desired salt precipitates from solution. The crystalline product so obtained is then recrystallized from acetone-ether to yield the pure hydrohalide salt. For instance, when 1.0 g. of 2-guanidinomethyl-3,4-dihydro-2H-1,5-benzodioxepine is dissolved in anhydrous diethyl ether and dry hydrogen chloride gas is subsequently passed into the resulting solution until saturation of same is complete with respect to said gas, there is obtained a crystalline precipitate of 2-guanidinomethyl-3,4-dihydro-2H-1,5-benzodioxepine hydrochloride.

*Example XII*

The nirtate, sulfate or bisulfate (other than those previously recorded), phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts of each of the 2-guanidinoalkyl-3,4-dihydro-2H-1,5-benzodioxepine bases previously reported in Examples IX–X are all prepared by separately dissolving in a suitable amount of ethanol the proper molar amounts of the respective acid and the appropriate organic base and then mixing the two solutions together, followed by the addition of diethyl ether to the resulting reaction solution in order to effect precipitation of the desired acid addition salt therefrom. For instance, when equimolar amounts of N-methyl-2-(3-methylguanidino)methyl-3,4-dihydro-2H-1,5-benzodioxepine and concen-

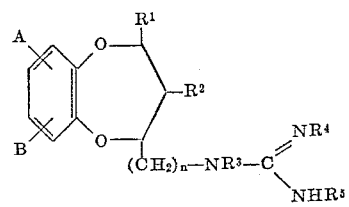

| A | B | R¹ | R² | n | R³ | R⁴ | R⁵ |
|---|---|---|---|---|---|---|---|
| H | H | CH₃ | H | 2 | H | H | H |
| 7-OC₂H₅ | 8-OC₂H₅ | H | H | 4 | H | H | H |
| 7-Cl | H | H | n-C₃H₇ | 1 | H | H | n-C₄H₉ |
| 7-Br | 8-Br | H | H | 3 | CH₃ | H | H |
| H | H | H | H | 4 | H | H | H |
| 6-CH₃ | H | H | H | 2 | H | CH₃ | CH₃ |
| 7-OCH₃ | H | H | H | 4 | H | H | H |
| H | 9-Cl | H | n-C₄H₉ | 1 | C₂H₅ | H | H |
| 6-Cl | H | H | CH₃ | 2 | H | C₂H₅ | C₂H₅ |
| 7-Br | H | CH₃ | H | 3 | CH₃ | H | CH₃ |
| 7-Cl | 8-Cl | H | H | 4 | H | H | H |
| 7-C₂H₅ | 8-C₂H₅ | H | H | 1 | H | H | H |
| 6-OC₂H₅ | H | H | C₂H₅ | 2 | H | H | H |
| H | 8-OCH₃ | H | H | 4 | H | H | C₂H₅ |
| 7-Cl | 8-Cl | n-C₃H₇ | H | 1 | H | H | H |
| 6-Br | H | H | CH₃ | 2 | n-C₄H₉ | H | H |
| 6-(n-C₄H₉) | H | H | H | 3 | H | H | H |
| 7-OC₂H₅ | H | CH₃ | H | 4 | H | CH₃ | CH₃ |
| H | H | H | H | 2 | H | H | iso-C₃H₇ |
| 6-Cl | H | H | iso-C₃H₇ | 3 | CH₃ | H | H |
| H | 9-(n-C₄H₉) | H | H | 1 | H | H | H |
| H | H | H | n-C₄H₉ | 4 | H | H | n-C₃H₇ |
| 7-Br | H | H | H | 1 | H | n-C₃H₇ | n-C₃H₇ |
| 7-CH₃ | 8-CH₃ | H | CH₃ | 4 | H | CH₃ | CH₃ |
| 7-OCH₃ | 8-OCH₃ | C₂H₅ | H | 3 | iso-C₃H₇ | H | H |
| H | H | H | C₂H₅ | 4 | H | H | CH₃ |
| H | 9-Cl | CH₃ | H | 2 | CH₃ | H | H |
| H | H | H | n-C₃H₇ | 4 | H | H | H |

*Example XI*

The non-toxic hydrohalide acid addition salts of each of the 2-guanidinoalkyl-3,4-dihydro-2H-1,5-benzodioxepine bases reported previously in Examples IX–X, such as hydrochloride, hydrobromide and hydroiodide salts thereof, are individually prepared by first dissolving the trated sulfuric acid react in accordance with this procedure, the corresponding product obtained is di[N-methyl-2-(3-methylguanidino)methyl-3,4-dihydro-2H-1,5-benzodioxepine]sulfate. In like manner, each of the other salts are similarly prepared.

What is claimed is:

1. A compound selected from the class consisting of 2-guanidinoalkyl-3,4-dihydro-2H-1,5-benzodioxepine bases of the formula:

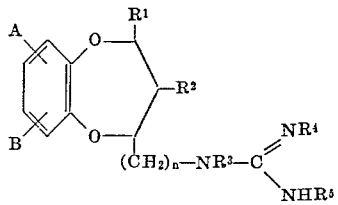

and the mineral and organic acid salts thereof, wherein each of A and B is a member selected from the group consisting of hydrogen, chlorine, bromine, lower alkyl and lower alkoxy; $n$ is an integer of from one to four, and each of $R^1$, $R^2$, $R^3$, $R^4$ and $R^5$ is a member selected from the group consisting of hydrogen and lower alkyl.

2. A compound of claim 1 wherein A, B, $R^1$, $R^2$, $R^3$, $R^4$ and $R^5$ are each hydrogen, and $n$ is an integer of from one to four.

3. A compound of claim 1 wherein A and B are each chlorine, $R^1$, $R^2$, $R^3$, $R^4$ and $R^5$ are each hydrogen and $n$ is an integer of from one to four.

4. A compound of claim 1 wherein A and B are each lower alkoxy, $R^1$, $R^2$, $R^3$, $R^4$ and $R^5$ are each hydrogen and $n$ is an integer of from one to four.

5. A compound of claim 1 wherein A, B, $R^1$, $R^3$, $R^4$ and $R^5$ are each hydrogen, $R^2$ is lower alkyl and $n$ is an integer of from one to four.

6. 2-guanidinomethyl-3,4-dihydro-2H-1,5-benzodioxepine.

7. 2 guanidinomethyl-7,8-dichloro-3,4-dihydro-2H-1,5-benzodioxepine.

8. 2-(3-guanidinopropyl)-3,4-dihydro-2H-1,5-benzodioxepine.

9. 2-(1-methylguanidino)methyl-3,4-dihydro-2H-1,5-benzodioxepine.

10. 2-guanidinomethyl-3-methyl-3,4-dihydro-2H-1,5-benzodioxepine.

No references cited.

ALEX MAZEL, *Primary Examiner.*

J. H. TURNIPSEED, *Assistant Examiner.*